(No Model.) 6 Sheets—Sheet 1.
J. H. STONEMETZ.
WEB PRINTING MACHINE.
No. 376,053. Patented Jan. 3, 1888.
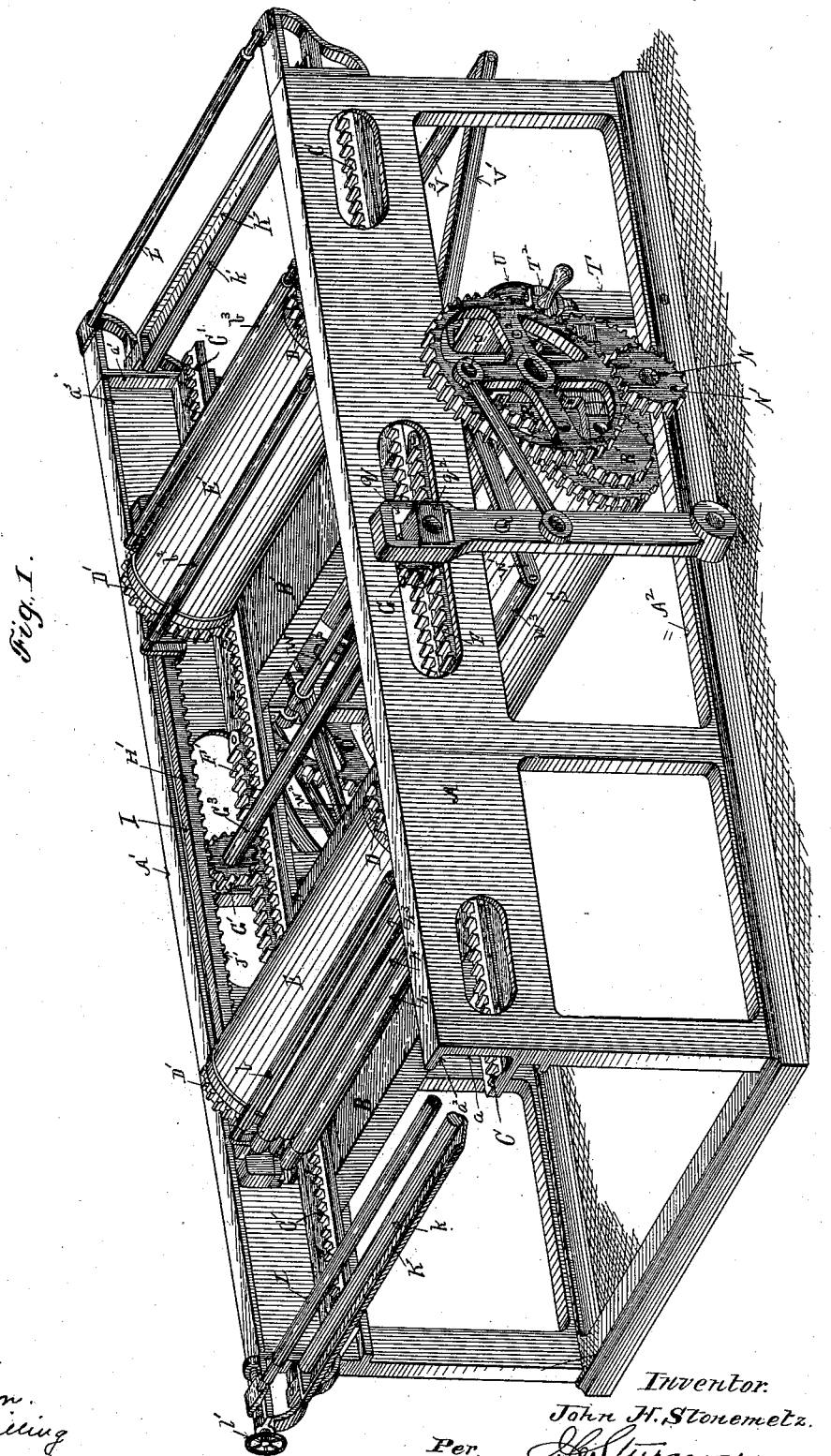
Witnesses
W. R. Edelen
John S. Rilling
Inventor.
John H. Stonemetz.
Per. _____ Att'y (No Model.)
J. H. STONEMETZ.
WEB PRINTING MACHINE.
No. 376,053. Patented Jan. 3, 1888.
6 Sheets—Sheet 2.
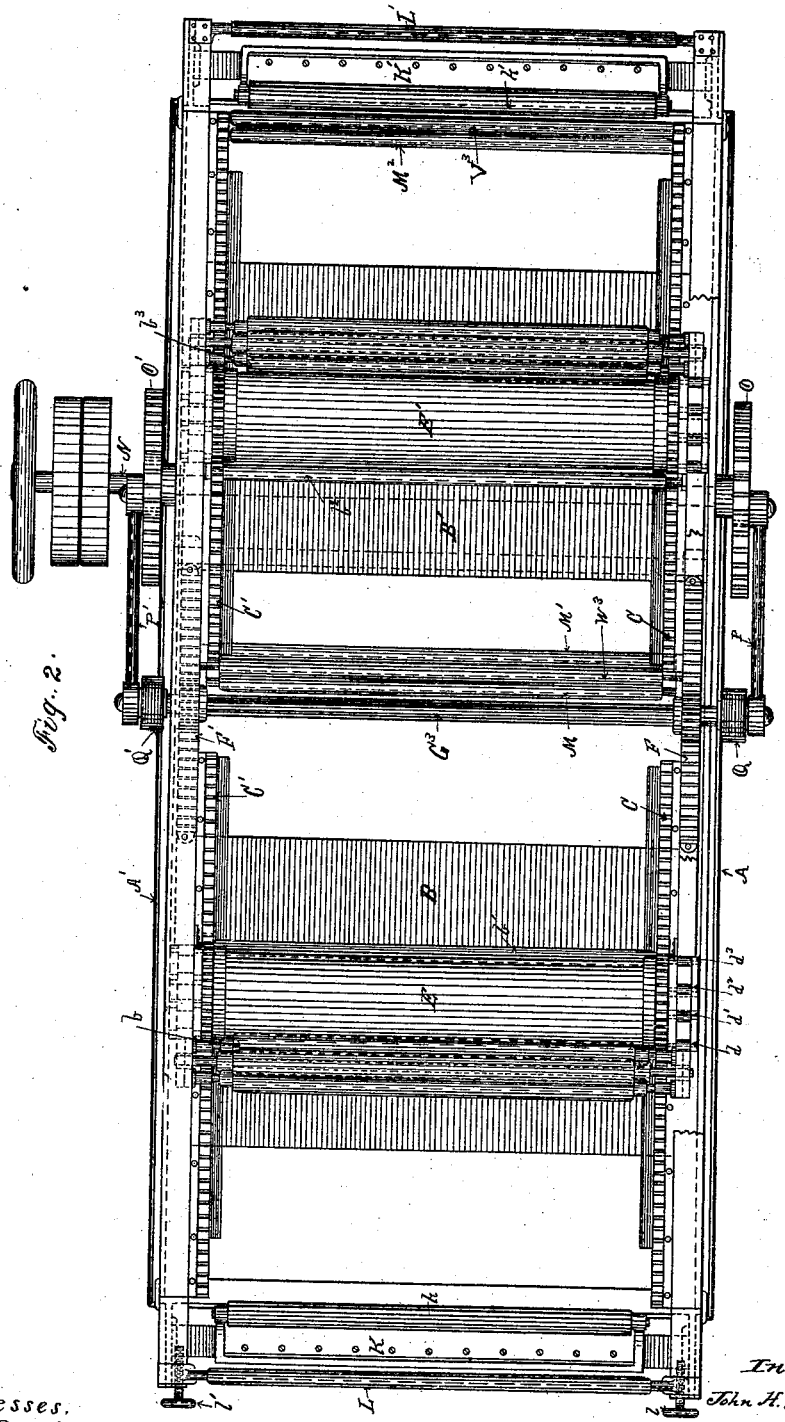

(No Model.) 6 Sheets—Sheet 3.
J. H. STONEMETZ.
WEB PRINTING MACHINE.
No. 376,053. Patented Jan. 3, 1888.
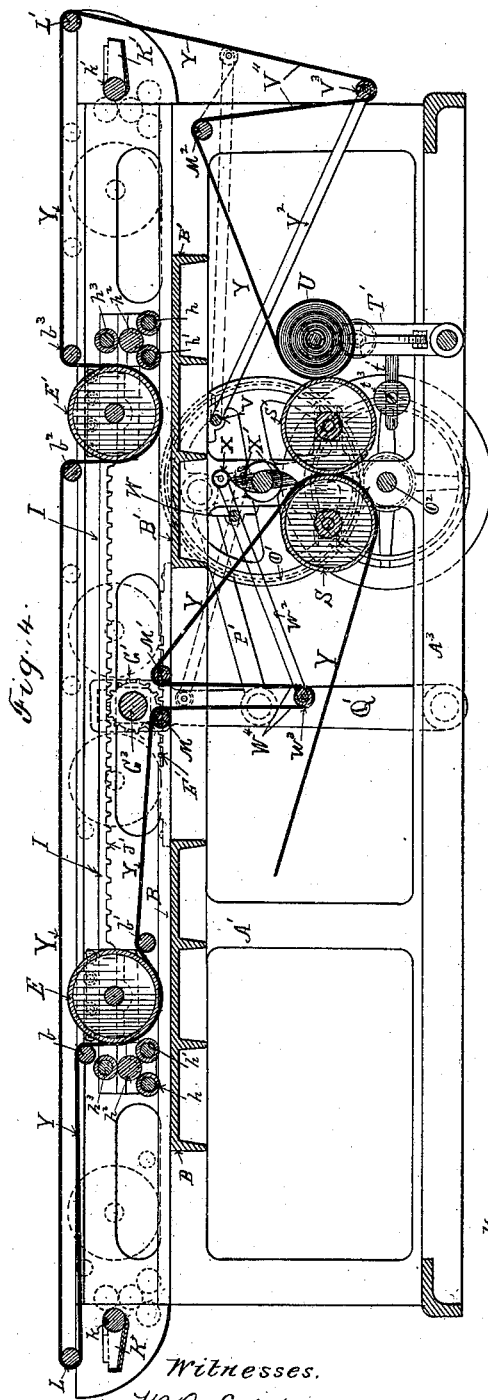
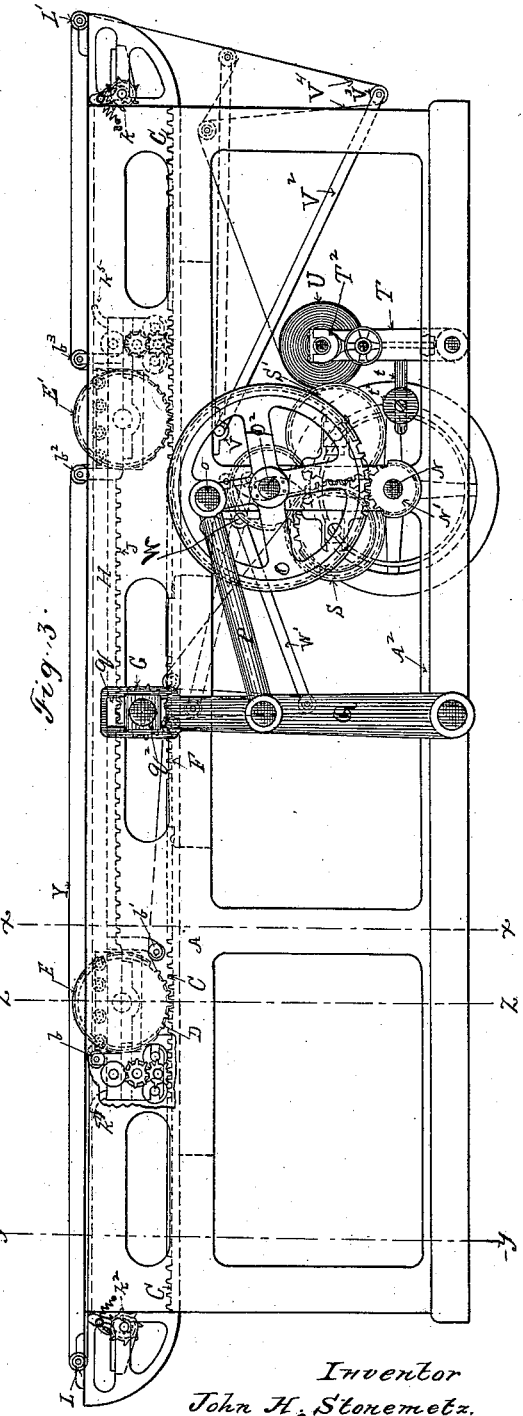
Witnesses.
W. R. Edden.
John S. Pilling.
Inventor
John H. Stonemetz.
per. J. S. Sturgeon
Att'y.

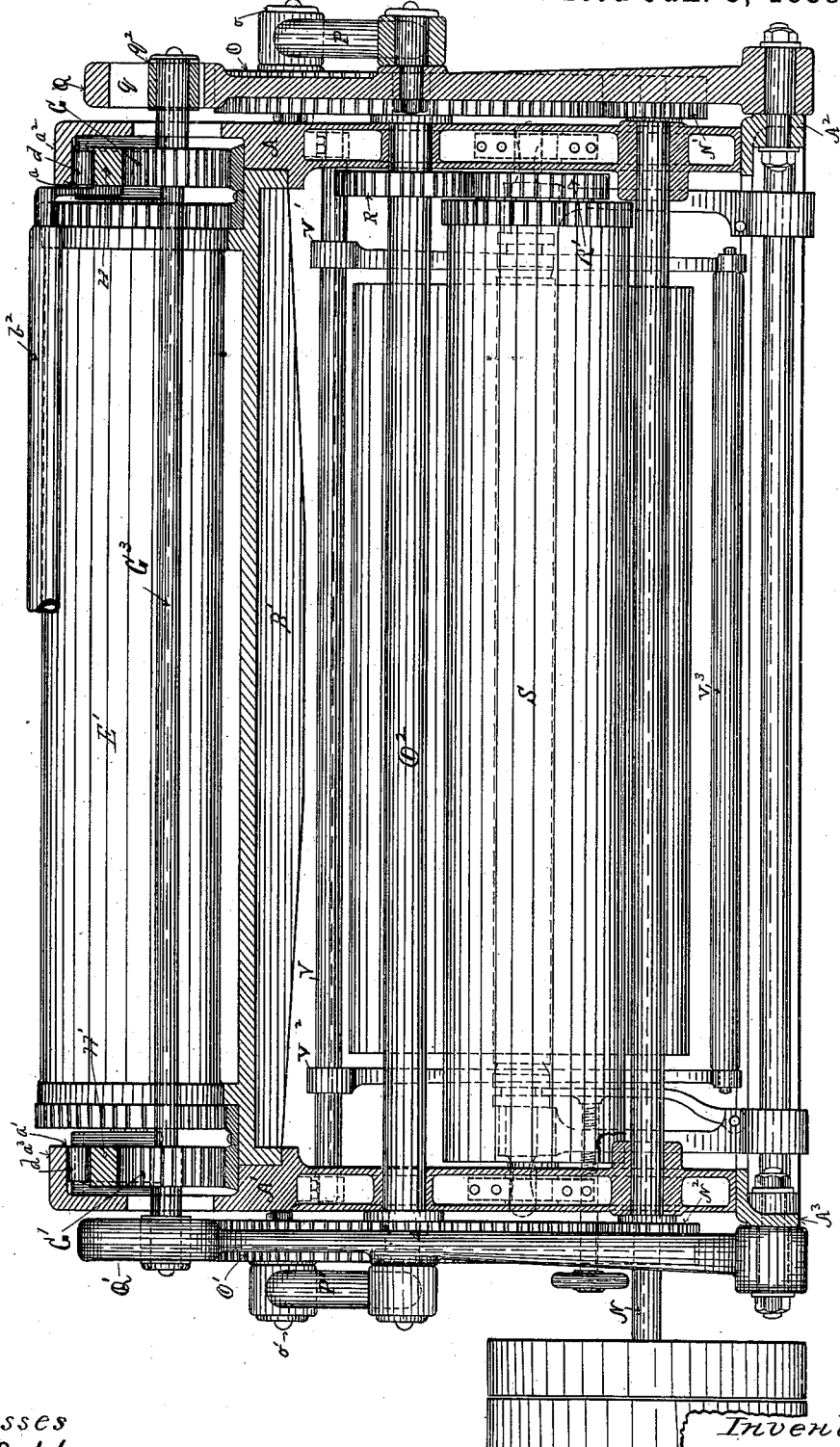

(No Model.) 6 Sheets—Sheet 5.

J. H. STONEMETZ.
WEB PRINTING MACHINE.

No. 376,053. Patented Jan. 3, 1888.

Witnesses
W. R. Edstin
John S. Rilling

Inventor
John H. Stonemetz
per L. C. Sturgeon
Att'y.

(No Model.) 6 Sheets—Sheet 6.
J. H. STONEMETZ.
WEB PRINTING MACHINE.

No. 376,053. Patented Jan. 3, 1888.

Witnesses
W. R. Edden
John S. Pilling

Inventor
John H. Stonemetz
Per H. Sturgeon
Att'y

UNITED STATES PATENT OFFICE.

JOHN H. STONEMETZ, OF ERIE, PENNSYLVANIA, ASSIGNOR TO THE STONE-METZ PRINTER'S MACHINERY COMPANY, OF MILLBURY, MASSACHUSETTS.

WEB-PRINTING MACHINE.

SPECIFICATION forming part of Letters Patent No. 376,053, dated January 3, 1888.

Application filed July 30, 1886. Serial No. 209,575. (No model.)

*To all whom it may concern:*

Be it known that I, JOHN H. STONEMETZ, a citizen of the United States, residing at the city of Erie, in the county of Erie and State of Pennsylvania, have invented certain new and useful Improvements in Web-Printing Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to web-printing machines; and it consists in the improvements hereinafter set forth and explained.

My invention is illustrated in the accompanying drawings, in which—

Figure 6:
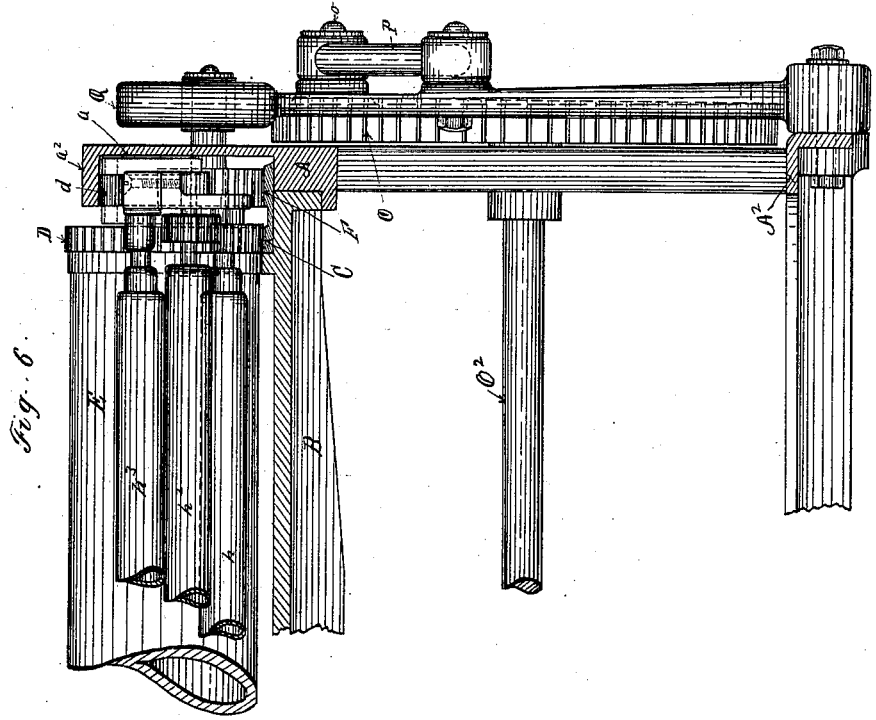
Figure 7:
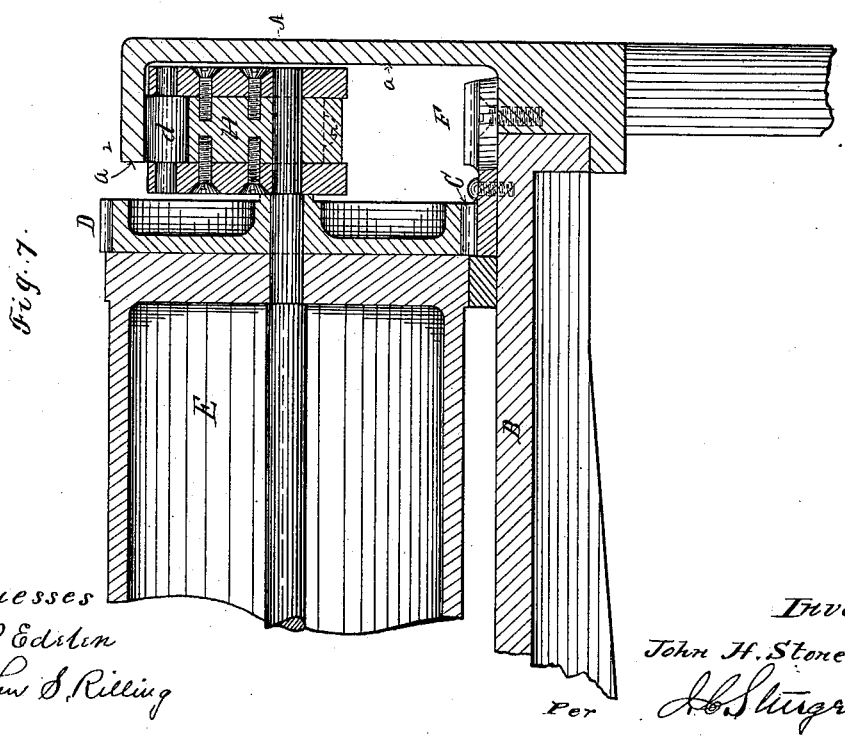
Figure 8:
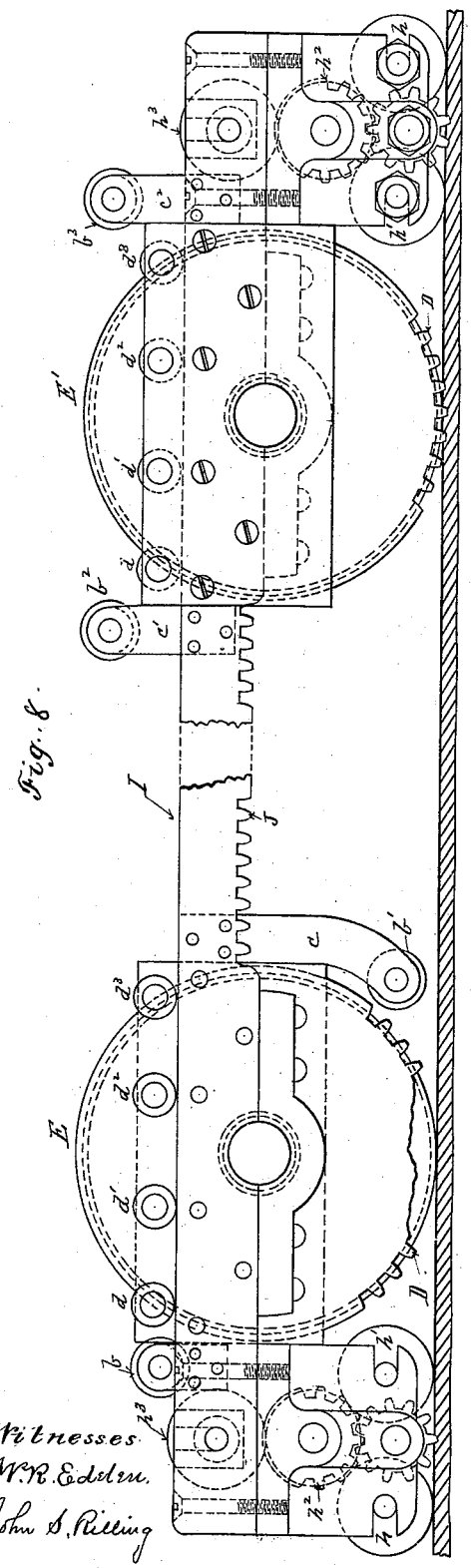
Figure 9:
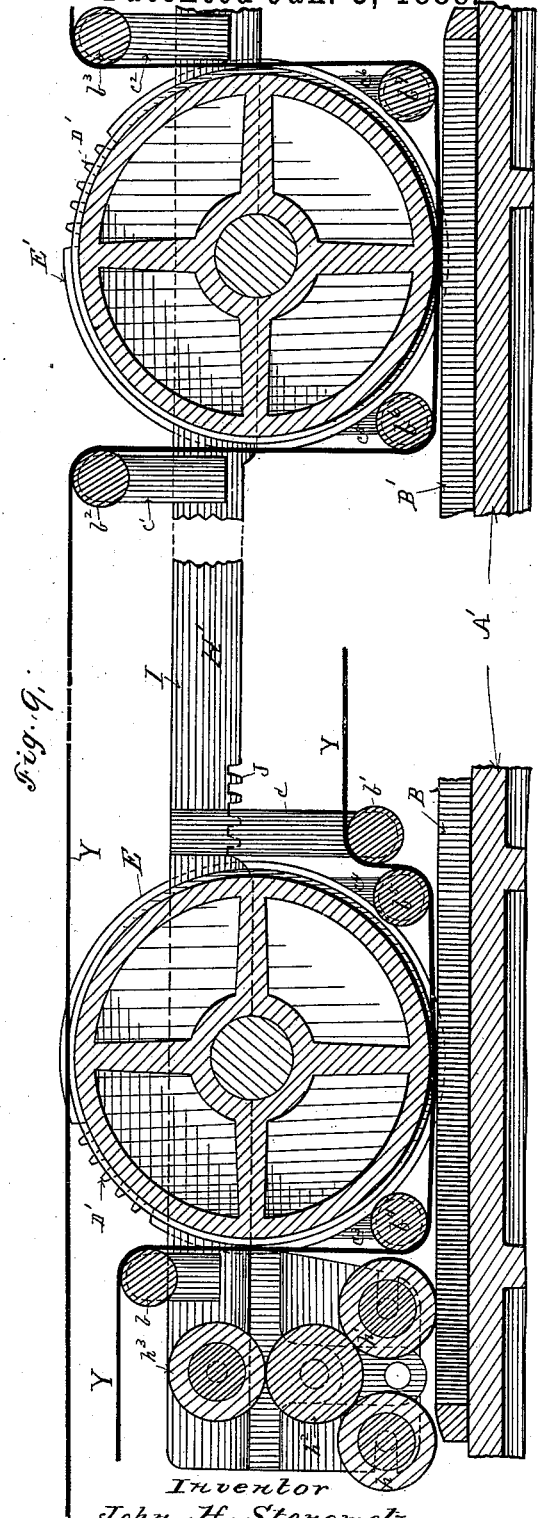

Figure 1 is a perspective view of my improved web-printing machine. Fig. 2 is a top or plan view of the same. Fig. 3 is a side elevation of same. Fig. 4 is a vertical central longitudinal section of the same. Fig. 5 is a transverse vertical section of same on line $x\,x$ in Fig. 3, showing one of the oscillating levers in section. Fig. 6 is a transverse vertical section of same on line $y\,y$ in Fig. 3, portions thereof being broken away. Fig. 7 is a transverse vertical section of same on line $z\,z$ in Fig. 3, portions thereof being broken away. Fig. 8 is an enlarged view of a side elevation of the impression-cylinder carriage and the mechanism mounted thereon. Fig. 9 is a longitudinal vertical section of the same, showing a modification of the web-carrying mechanism thereon.

Like letters refer to like parts in all the figures.

In the construction of my improved web-printing machine shown, A A' are the side frames, and B B' stationary flat type-beds secured thereto. Parallel to the sides of the type-beds B B', I secure to the side frames, A A', rack-gears C C'. I also secure to the side frames, A A', outside of the rack-gears C C', a second set of rack-gears, F F', for the purpose hereinafter set forth. Above the level of the beds B B' the side frames, A A', are recessed out at $a\,a'$, so that the overhanging edges $a^2$ and $a^3$ are directly over the racks F F'.

In the recesses $a\,a'$ the side frames, H H', of the traveling impression-cylinder carriage I operate. This carriage I consists, principally, of side frames, H H', in which are journaled impression-cylinders E E' and web-carrying rollers $b\,b'\,b^2\,b^3$. The under edges of the side frames, H H', between the impression-cylinders E E', are provided with rack-gears J J', so that the spur-gears G G' on the shaft $G^3$ operate between the racks J J' and the racks F F' for moving the carriage I and the mechanism carried thereby back and forth over the beds B B', this movement of the carriage I being sufficient to cause each impression-cylinder and the inking-rollers $h\,h'\,h^2\,h^3$ belonging thereto to traverse a little more than the length of its type-bed, so as to pass entirely off of the ends of the beds.

The impression-cylinders E E' are provided at each end thereof with spur-gears D D', which operate in the rack-gears C C' on the frame.

Between the overhanging portions $a^2\,a^3$ of the side frames, A A', and the upper surfaces of the sides H H' of the carriage I, over the journals of the impression-cylinders E E', I place friction-rollers $d\,d'\,d^2\,d^3$, journaled in bearings in the frame of the carriage I. These rollers operate to keep the impression-cylinders E E' down firmly upon their type-beds B B'. At each end of the side frames, A A', I place ink-fountains K K', provided with feed-rollers $k\,k'$, with which the carriage I in its traverse brings the rollers $h^3$ thereon into contact, the rollers $k\,k'$ being operated by ordinary ratchets and dogs, $k^2\,k^3$, (illustrated in Fig. 3,) with which arms $k^4$ and $k^5$ on the carriage I come in contact as the carriage I nears the ends of its traverse.

Web-carrying rollers L L' are placed at each end of the frames A A', above the ink-fountains K K', the roller L being mounted in adjustable bearings adapted to be moved in and out by screws $l\,l'$, as shown in Figs. 1 and 2. In the central portion of the frames A A', I place the web-carrying rollers M M', and near one end of the frames A A', somewhat below the ink-fountain K', I place the web-carrying roller $M^2$. These several web-carrying rollers, together with the web-carrying rollers $b$ $b'$ $b^2$ $b^3$ on the carriage I, carry and support the web of paper during its passage through the machine.

Across the power part of the frames A A', I place a driving-shaft, N, provided with spur-gears $N'$ $N^2$, which spur-gears $N'$ $N^2$ intermesh with larger gear-wheels, O O', on a cross shaft, $O^2$, mounted in the frames A A'. The gear-wheels O O' are provided with wrist pins $o$ $o'$, from which pitmen P P' extend to upright rocking levers Q Q', journaled in the bases $A^2$ $A^3$ of the side frames, A A', the upper ends of the levers Q Q' being provided with slotted bearings $q$ $q'$, to receive vertically-movable boxes $q^2$ $q^3$, which form the bearings for the cross-shaft $G^3$, hereinbefore described, the movement of the levers Q Q' causing the spur-gears G G' to traverse the racks F F' and J J', thereby moving the carriage I back and forth over the type-beds B B' at each revolution of the wheels O O'. On the shaft $O^2$, I also place a gear-wheel, R, which intermeshes with the spur-gear R' on the cutting-cylinder S, which cylinder S is in turn geared to the other cutting-cylinder, S'.

Behind the cutting-cylinder S', I place upright standards T T', pivoted in the bases of $A^2$ $A^3$ of the frames A A'. These standards T T' are provided with adjustable bearings $T^2$ $T^3$, to receive the journal of the web-roll. The standards T T' are also provided with horizontal arms $t$ $t'$, upon which are placed adjustable weights $t^2$ $t^3$, which operate to keep the web-roll U in close contact with the cutting-cylinder S', so as to insure the driving of the web-roll U at a uniform rate of peripheral speed with the cutting-cylinder S' by frictional contact therewith. In this frame-work A A', directly under the type-bed B', I journal a cross-shaft, V, to each end of which I secure arms $V'$ $V^2$, which extend slightly beyond the web-roll $M^2$ in the end of the frames A A'. In the ends of these arms $V'$ $V^2$, I journal a roller, $V^3$. This roller $V^3$ rests in and is supported by a loop, $V^4$, formed by the web of paper between the rollers $M^2$ and L', and vibrates up and down, as shown in dotted lines in Figs. 3 and 4, to take up the slack of the web as it is unrolled from the web-roll U.

A little in front of and above the shaft $O^2$, I journal a cross-shaft, W, provided with arms $W'$ $W^2$, secured thereto near each end thereof. These arms project forward to a point nearly under the web-rollers M M' and backward a short distance, where they are provided with friction-rollers X, which are operated upon by cams X' on the shaft $O^2$.

In the long ends of the arms W' and $W^2$, I journal a roller, $W^3$. This roller $W^3$ rests in and is supported by the loop $W^4$, formed by the web of paper between the rollers M M', vibrating up and down, as shown in dotted lines in Figs. 3 and 4, it being alternately raised by the cutting-rollers taking up the web, and moved back to its lowest point by the cams X' acting upon the friction-rollers X on the short ends of the arms W' $W^2$. Each movement downward of the arms W' $W^2$ and the roller $W^3$, journaled therein, operates to take up and draw forward the slack of the web Y, formed by the loop $V^4$, (raising the roller $V^3$ up in the operation, as shown by the dotted lines in Figs. 3 and 4,) so as to present fresh surfaces of the web of paper between the impression-cylinders E E' and the type on the beds B B', this movement of the arms W' and $W^2$ occurring at each traverse of the impression-cylinder carriage I as soon as the cylinders E E' have passed off of the type-beds B B'.

The movement of the cutting-cylinders S S' and of the web-roll U being constant and uniform, the amount of web taken up in a given time by the cutting-rollers S S' will just equal the slack thrown off of U, forming the loop $V^4$, ready to be drawn forward by the roller $W^3$, the supporting-arms W' $W^2$ thereof being actuated by the cams X'. This action being repeated after each traverse of the impression-cylinders E E' over the beds B B' intermittently moves the web Y forward to be printed.

In operation the web-roll is placed in the supports T T'. The web is then drawn over the roller $M^2$ and under the roller $V^3$, and from thence over the roller L', from whence it is carried over the top of the machine to and over the roller $b^3$, and then under the impression-cylinder E' and up over the roller $b^2$, and from this roller over the top of the machine to and around the adjustable roller L, and back to and over the roller $b$ and under the impression-cylinder E and over the roller $b'$, and from thence to and over the roller M, around under the roller $W^3$, and back up over the roller M', from whence it passes to and between the cutting-cylinders S S', where it is cut into sheets. It is obvious that this arrangement of the web Y presents one of its sides to the type-bed B', operated upon by the impression-cylinder E', and the other side to the type-bed B, operated upon by the impression-cylinder E, so that when forms of type are placed upon the beds B and B' one side of a newspaper will be printed upon the web Y by the impression-cylinder E' and the other side of the newspaper will be printed upon the other side of the web Y at another point by the impression-cylinder E, both by the same movement of the cylinder-carriage I, two sides of the newspaper being printed as the carriage I travels over the beds forward and a like amount as the carriage I travels back, (the web having been meanwhile moved ahead the length of the printed sheet by the oscillating roller $W^3$,) the adjustment being such that the opposite side of each paper printed by the form on the bed B' is in turn presented to and printed by the form on the bed B in its passage through the machine. In this manner a web of paper can be printed on both sides as it passes through the machine.

In Fig. 9 I have shown a modification of the web-carrying mechanism, consisting in adding the additional web-carrying rollers $b^4$ $b^5$ and $b^6$ $b^7$, one on each side of each of the impression-cylinders E E'. These rollers are suspended from hangers on the carriage I on each side of the impression-rollers E E', the object of these rollers being to carry the web substantially free from and reduce the friction thereof upon the impression-cylinders E E'.

I am aware that many other modifications may be made in the mechanism of my machine by those skilled in the art to which it appertains without departing from the spirit of my invention. Therefore I do not desire to limit myself to the exact construction shown; but

What I claim as new, and desire to secure by Letters Patent of the United States, is—

1. The combination, in a printing-machine, of two stationary type-beds located substantially in the same horizontal plane, with traveling impression-cylinders operating thereon, substantially as and for the purpose set forth.

2. The combination, in a printing-machine, of stationary type-beds located on substantially the same plane, and traveling impression-cylinders and inking-rollers, with web-carrying rollers adapted to present one side of a web of paper to one type-bed and the other side of the web to the other type-bed, substantially as and for the purpose set forth.

3. In a printing-machine, the combination of stationary type-beds located on substantially the same horizontal plane, with an impression-cylinder carriage adapted to travel back and forth over said type-beds and carry impression-cylinders and inking-rollers thereon adapted to operate both forward and back on type-forms placed on said stationary beds, substantially as and for the purpose set forth.

4. In a printing-machine, the combination of two stationary type-form beds secured to the frame of the machine on substantially the same horizontal plane, with a traveling carriage carrying an impression-cylinder and inking-rollers for each of said type-beds, and means, substantially as shown, for operating said cylinder-carriage so as to move each of said impression-cylinders back and forth over its own type-bed, substantially as and for the purpose set forth.

5. In a printing-machine, the combination of two stationary type-beds located on the same horizontal plane, and a traveling carriage carrying an impression-cylinder and inking-rollers for each of said beds, operating on said beds in their forward and backward movements, with means, substantially as described, for moving said carriage back and forth over said beds, and rollers adapted to convey a web of paper through said machine, whereby one side of the web may be printed on forms placed on one of said beds and the other side of the web on forms placed on the other of said beds, substantially as and for the purpose set forth.

6. The combination, in a printing-machine, of side frames supporting stationary type-beds located on substantially the same horizontal plane, rack-gears on said side frames at the sides of said type-beds, and ink-fountains between the ends of said side frames, with a carriage conveying impression-cylinders having spur-gears on the ends thereof, operating in said rack-gears on the frames back and forth over said type-beds, so as to print at both their forward and backward movements, and inking-rollers traveling back and forth over said type-beds and taking their ink-supply from the fountains at the ends of the press-frames, substantially as and for the purpose set forth.

7. The combination, in a printing-machine, of stationary type-beds secured to the frame of the machine, and a traveling carriage carrying impression-cylinders and inking-rollers and web-carrying rollers thereon, a vertically-moving roller for taking up the slack of the web as it is unwound from the web-roll, and a vertically-moving roller for drawing the web forward, substantially as and for the purpose set forth.

8. The combination, in a printing-machine, of stationary type-beds and a traveling carriage conveying impression-cylinders and inking-rollers back and forth over said beds, with web-carrying rollers on said traveling carriage, stationary and adjustable web-carrying rollers on the frame-work of the machine, and means, substantially as described, for intermittently drawing the web forward, substantially as and for the purpose set forth.

9. The combination, in a traveling cylinder-carriage for a printing-machine, of horizontal side frames carrying impression-cylinders and provided with friction pressure-rollers, and also with rack-gears on the under edges of said frames, with corresponding rack-gears on the frame of the machine, spur-gears operating between the rack-gears on the carriage and the rack-gears on the frame, and levers in which said spur-gears are journaled, adapted to move said spur-gears back and forth, substantially as and for the purpose set forth.

10. In a printing-machine, the combination, with stationary type-beds located on substantially the same horizontal plane on the frame of the machine, and traveling impression-cylinders and inking-rollers adapted to travel back and forth over said type-beds and take impressions both ways, of web-carrying rollers on the frame of the machine, web-carrying rollers connected with the traveling impression-cylinder carriage, and means, substantially as shown and described, for taking up the slack of the web as it runs off of the web-roll while the impression cylinders are passing over the type-beds, and means, substantially as shown and described, for drawing the web forward when the impression-cylinders are off of the type-forms, substantially as and for the purpose set forth.

11. The combination, in a printing-machine, of a traveling impression-cylinder carriage having rack-gears on the side frames thereof, rack-gears on the frame of the machine, spur-gears operating between the rack-gears on the carriage and the rack-gears on the frame, having their bearings in vertical levers mounted on the machine-frame, and crank-wheels connected to and operating said vertical levers, substantially as and for the purpose set forth.

12. The combination, in a printing-machine, of the side frames, A A', the stationary type-beds B B', with the traveling cylinder-carriage I, carrying the impression-cylinders E E, which operate both forward and backward on said type-beds, substantially as and for the purpose set forth.

13. The combination, in a printing-machine, of the cylinder-carriage I, having rack-gears J J' thereon, with the rack-gears F F' on the frame, the spur-pinions G G', and the crank-wheels O O', substantially as and for the purpose set forth.

14. The combination, in the cylinder-carriage I, of the side frames, H H', and the impression-cylinders E E', with the web-carrying rollers $b\ b'\ b^2\ b^3$, mounted therein, substantially as and for the purpose set forth.

15. The combination, in the cylinder-carriage I, with the side frames, H H', and the impression-cylinders E E', mounted in the said carriage on the same horizontal plane, of the inking-rollers $h\ h'\ h^2\ h^3$ and web-carrying mechanism, substantially as and for the purpose set forth.

16. The combination, in the cylinder-carriage I, of the side frames, H H', provided with rack-gears J J', the impression-cylinders E E', provided with spur-gears D D', intermeshing with the rack-gear C C', the inking-rollers $h\ h'\ h^2\ h^3$, and the web-carrying rollers $b, b^4, b^5, b', b^2, b^6, b^7$, and $b^3$, substantially as and for the purpose set forth.

17. The combination, in a printing-machine, of the web-supporting rollers M M' and the vertically-moving roller $W^3$, supported upon the arm $W'\ W^2$, with the cutting-cylinders S S', substantially as and for the purpose set forth.

18. The combination, in a printing-machine, of the main driving-shaft N and its spur-gears $N'\ N^2$, the crank-wheels O O', pitmen P P', levers Q Q', and shaft $G^3$, having thereon spur-gears G G', intermeshing with the rack-gears J F and J' F', substantially as and for the purpose set forth.

In testimony whereof I affix my signature in presence of two witnesses.

JOHN H. STONEMETZ.

Witnesses:
JOHN S. RILLING,
BARD. STANFORD.